United States Patent
Toyodome et al.

(10) Patent No.: US 9,695,925 B2
(45) Date of Patent: Jul. 4, 2017

(54) METHOD OF MANUFACTURING BAR MEMBER AND BAR MEMBER

(71) Applicants: JTEKT CORPORATION, Osaka-shi, Osaka (JP); Ibaraki Industrial Corporation, Ibaraki-shi, Osaka-fu (JP)

(72) Inventors: Shuji Toyodome, Ibaraki (JP); Takeshi Kunishima, Nara (JP)

(73) Assignees: JTEKT CORPORATION, Osaka (JP); IBARAKI INDUSTRIAL CORPORATION, Ibaraki-Shi (JP)

( * ) Notice: Subject to any disclaimer, the term of this patent is extended or adjusted under 35 U.S.C. 154(b) by 186 days.

(21) Appl. No.: 14/612,687

(22) Filed: Feb. 3, 2015

(65) Prior Publication Data

US 2015/0219201 A1 Aug. 6, 2015

(30) Foreign Application Priority Data

Feb. 4, 2014 (JP) ................................. 2014-019475

(51) Int. Cl.
| | |
|---|---|
| *F16H 55/06* | (2006.01) |
| *B29C 70/32* | (2006.01) |
| *B29C 70/86* | (2006.01) |
| *B29C 37/00* | (2006.01) |
| *F16C 3/02* | (2006.01) |

(Continued)

(52) U.S. Cl.
CPC ......... *F16H 55/06* (2013.01); *B29C 37/0082* (2013.01); *B29C 70/32* (2013.01); *B29C 70/86* (2013.01); *F16C 3/026* (2013.01); *F16H 55/26* (2013.01); *B29L 2023/22* (2013.01); *B29L 2031/24* (2013.01); *B29L 2031/75* (2013.01); *B29L 2031/7752* (2013.01); *F16C 2226/60* (2013.01); *F16C 2326/24* (2013.01); *Y10T 29/49465* (2015.01); *Y10T 74/19* (2015.01)

(58) Field of Classification Search
CPC ................................. B29C 70/32; F16H 55/06
USPC .......................................................... 156/172
See application file for complete search history.

(56) References Cited

U.S. PATENT DOCUMENTS

| | | | | |
|---|---|---|---|---|
| 4,171,626 A | * | 10/1979 | Yates | .................... B29C 53/665 138/130 |
| 4,238,539 A | * | 12/1980 | Yates | ..................... B29C 70/32 156/172 |

(Continued)

FOREIGN PATENT DOCUMENTS

| | | | |
|---|---|---|---|
| GB | 2154299 A | * | 9/1985 |
| JP | H05-193097 A | | 8/1993 |

(Continued)

OTHER PUBLICATIONS

Apr. 1, 2015 Extended Search Report issued in European Application No. 15153731.3.

*Primary Examiner* — Jeff Aftergut

(74) *Attorney, Agent, or Firm* — Oliff PLC

(57) ABSTRACT

A method of manufacturing a bar member including a pipe and metal members includes: forming a core member including a metal ring having an outer peripheral face subjected to face roughening and a mandrel; winding glass fibers around the outer peripheral face; winding a carbon fiber prepreg around the core member; forming the pipe externally fitted and fixed to the outer peripheral face by baking and curing the carbon fiber prepreg; pulling the mandrel out of the pipe; and screwing together the metal members and the metal ring.

7 Claims, 5 Drawing Sheets

(51) Int. Cl.
   *F16H 55/26*  (2006.01)
   *B29L 31/24*  (2006.01)
   *B29L 31/00*  (2006.01)
   *B29L 23/00*  (2006.01)

(56) References Cited

U.S. PATENT DOCUMENTS 4,380,443 A    4/1983  Federmann et al.
4,569,710 A *  2/1986  Lambot .................. B29C 70/32
                                                    156/172

FOREIGN PATENT DOCUMENTS

| JP | H07-91433      | 4/1995 |
| JP | 2012-153314 A  | 8/2012 |
| WO | 2006/066309 A1 | 6/2006 |

\* cited by examiner

METHOD OF MANUFACTURING BAR MEMBER AND BAR MEMBER

INCORPORATION BY REFERENCE

The disclosure of Japanese Patent Application No. 2014-019475 filed on Feb. 4, 2014 including the specification, drawings and abstract is incorporated herein by reference in its entirety.

BACKGROUND OF THE INVENTION

1. Field of the Invention

The present, invention relates to a method of manufacturing a bar member included in, for example, a steering apparatus of a vehicle, and the bar member.

2. Description of Related Art

A propeller shaft in Japanese Patent Application Publication No. 7-91433 is manufactured by mounting a metal thin-walled ring having an outer diameter substantially equal to the inner diameter of a body cylinder made of fiber reinforced plastic (FRP), on the inner side of an end portion of the body cylinder, and press-fitting a metal joint having an outer diameter larger than the inner diameter of the thin-walled ring into the inner side of the thin-walled ring. At the time of press-fitting, hard particles disposed on the outer peripheral face of the thin-walled ring dig into the inner face of the body cylinder made of FRP.

Examples of the application of FRP include a roll body of a gravure printing roll where a cylindrical body made of FRP is internally fitted to an inner portion of a cylindrical body made of metal via an adhesive layer as described in Japanese Patent Application Publication No. 5-193097, and a rack obtained by winding and laminating a prepreg around a core, and thereby forming an outer shell of carbon fiber reinforced plastic as described in Japanese Patent Application Publication No. 2012-153314.

SUMMARY OF THE INVENTION

In the propeller shaft in JP 7-91433 A, there is a possibility that the body cylinder made of FRP will be detached from the thin-walled ring made of metal. In each of JP 5-193097 A and IP 2012-153314 A, there is also a possibility that the member made of FRP and the member made of metal will be separated from each other due to insufficient connection between these members. The present invention provides a method of manufacturing a bar member configured to prevent a pipe made of a carbon fiber reinforced resin from being detached from a member made of metal when the pipe and the member made of metal are connected together to constitute the bar member, and also provides the bar member.

A first aspect of the present invention is a method of manufacturing a bar member including a pipe made of a carbon fiber reinforced resin, and a metal member that is fastened to an end portion in an axial direction of the pipe. The manufacturing method includes: forming a core member including a mandrel made of metal that extends in the axial direction and a metal ring having an outer peripheral face subjected to face roughening, by externally fitting the metal ring to the mandrel; winding glass fibers around the outer peripheral face of the metal ring; interposing the glass fibers between a prepreg sheet obtained by impregnating carbon fibers with a resin and the outer peripheral face of the metal ring by winding the prepreg sheet around an outer peripheral face of the core member; forming the pipe where the end portion is externally fitted and fixed to the outer peripheral face of the metal ring by baking and curing the prepreg sheet wound around the outer peripheral face of the core member; pulling only the mandrel in the core member out of the pipe; and screwing together the metal member and an inner peripheral face of the metal ring.

In accordance with the first aspect of the present invention, the bar member includes the pipe made of a carbon fiber reinforced resin, and the metal member that is fastened to the end portion in the axial direction of the pipe. Also, the core member formed for manufacturing the bar member includes the mandrel made of metal that extends in the axial direction and the metal ring, the outer peripheral face of which is subjected to the face roughening, and that is externally fitted to the mandrel. When the bar member is manufactured, first, the glass fibers are wound around the outer peripheral face of the metal ring. The prepreg sheet obtained by impregnating the carbon fibers with the resin is wound around the outer peripheral face of the core member, and thereafter cured by baking to form the pipe. In the pipe, the end portion in the axial direction is externally fitted and fixed to the outer peripheral face of the metal ring. Only the mandrel in the core member is pulled out of the pipe, and the metal member and the metal ring are screwed together. Accordingly, the bar member is completed.

After baking and curing the prepreg sheet, the metal ring is internally fitted to the end portion of the pipe. In the state, the resin oozing out from the prepreg sheet enters concave portions of the outer peripheral face of the metal ring subjected to the face roughening (concave-convex machining), and is cured therein. Accordingly, since the end portion of the pipe is in close contact with the outer peripheral face of the metal ring, the pipe is less likely to be detached from the metal ring. Moreover, the glass fibers wound around the outer peripheral face of the metal ring are also interposed between the prepreg sheet and the outer peripheral face of the metal ring. Therefore, the glass fibers are fixed in a state in which the glass fibers enter the concave portions of the outer peripheral face of the metal ring, and are caught on convex portions of the outer peripheral face of the metal ring after the bake-curing. Thus, the pipe is more hardly detached from the metal ring with the glass fibers therebetween. As the result, the pipe can be prevented from being detached from the metal ring that is a member made of metal.

In the above aspect, a process of winding the glass fibers around the outer peripheral face of the metal ring may include a process of winding fabric of the glass fibers around the outer peripheral face of the metal ring.

In accordance with the above method, the fabric of the glass fibers is wound around the metal ring as the process of winding the glass fibers around the outer peripheral face of the metal ring. Therefore, the convex portions of the outer peripheral face of the metal ring enter interstices of the fabric, so that the glass fibers in the fabric enter the concave portions of the outer peripheral face of the metal ring, and are fixed to the outer peripheral face of the metal ring by the bake-curing. Accordingly, the metal ring and the pipe are more rigidly fixed together, and the pipe becomes more hardly detached from the metal ring.

In the above first aspect, the process of winding the glass fibers around the outer peripheral face of the metal ring may include a process of winding a non-woven fabric of the glass fibers around the outer peripheral face of the metal ring.

In accordance with the above method, the non-woven fabric of the glass fibers is wound around the outer peripheral face of the metal ring as the process of winding the glass fibers around the outer peripheral face of the metal ring. The glass fibers in the non-woven fabric are fixed entering the concave portions of the outer peripheral face of the metal ring in a state in which the glass fibers are oriented in various directions. The glass fibers are caught on the convex portions of the outer peripheral face of the metal ring from various directions to effectively act as resistance. The pipe thereby becomes more hardly detached from the metal ring.

The above first aspect may further include exposing a portion of the metal ring such that the portion protrudes to an outer side in the axial direction from the completed pipe when each of the glass fibers and the prepreg sheet is wound around the outer peripheral face of the core member.

In accordance with the above method, when each of the glass fibers and the prepreg sheet is wound around the outer peripheral face of the core member, a portion of the metal ring is exposed such that the portion protrudes to the outer side in the axial direction from the completed pipe. Therefore, when the pipe is to be bent against the metal member, the metal member comes into contact with the metal ring, not the pipe. It is thus possible to prevent each of the end portions of the pipe from coming into contact with the corresponding one of the metal members. Accordingly, it is possible to prevent the pipe from being damaged by coming into contact with the metal member.

The above first aspect may further include forming, on the inner peripheral face of the metal ring, a female threaded portion that is to be screwed to a male threaded portion provided on the metal member.

In accordance with the above method, when the metal member and the inner peripheral face of the metal ring are screwed together, the male threaded portion provided on the metal member is screwed to the female threaded portion formed on the inner peripheral face of the metal ring. The process of forming the female threaded portion on the inner peripheral face of the metal ring may be performed before the metal ring is externally fitted to the mandrel, or after the mandrel is pulled out of the pipe.

A second aspect of the present invention is a bar member manufactured by the manufacturing method according to the first aspect. The bar member may constitute a rack bar included in a rack-and-pinion-type steering apparatus.

In the bar member of the above aspect, the pipe can be prevented from being detached from the metal ring that is a member made of metal.

BRIEF DESCRIPTION OF THE DRAWINGS

Features, advantages, and technical and industrial significance of exemplary, embodiments of the invention will be described below with reference to the accompanying drawings, in which like numerals denote like elements, and wherein.

DETAILED DESCRIPTION OF EMBODIMENTS

Figure 1:
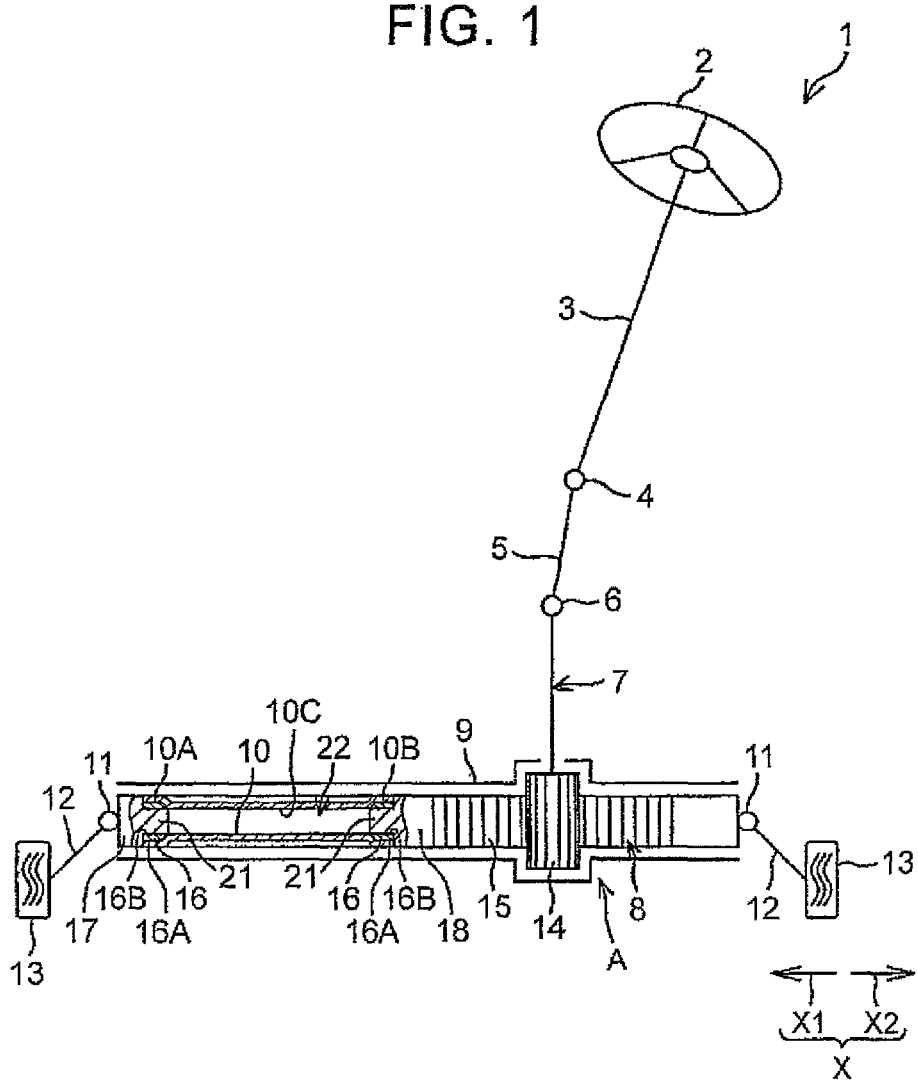
FIG. 1 is a schematic front view of a steering apparatus including a bar member according to one embodiment of the present invention.

Hereinafter, an embodiment of the present invention is described in detail with reference to the accompanying drawings. FIG. 1 is a schematic front view of a steering apparatus 1 including a bar member 22 according to one embodiment of the present invention. As illustrated in FIG. 1, the steering apparatus 1 mainly includes a steering member 2, a steering shaft 3, an intermediate shaft 5, a pinion shaft 7, a rack bar 8, and a housing 9.

For example, a steering wheel may be used as the steering member 2. One end of the steering shaft 3 is connected to the steering member 2. The other end of the steering shaft 3 and one end of the intermediate shaft 5 are connected together via a universal joint 4. The other end of the intermediate shaft 5 and one end of the pinion shaft. 7 are also connected together via a universal joint 6. A pinion 14 is provided integrally with the outer peripheral face of the other end of the pinion shaft 7. The rack bar 8 is a generally columnar member extending in the vehicle-width direction (the right-left direction in FIG. 1). The direction in which the rack bar 8 extends will be referred to as an axial direction X. The axial direction X coincides with the vehicle-width direction. With respect to the position of the steering apparatus 1 in FIG. 1, the left side in the axial direction X will be denoted by a reference symbol "X1", and the right side in the axial direction X will be denoted by a reference symbol "X2".

A rack 15 that meshes with the pinion 14 is formed at one position in the circumferential direction of the outer peripheral face of the rack bar 8. The pinion 14 of the pinion shaft 7 and the rack 15 of the rack bar 8 mesh with each other to constitute a rack-and-pinion steering mechanism A. The rack bar 8 is accommodated in the housing 9. The housing 9 is a generally cylindrical body fixed to a vehicle body. The opposite end portions of the rack bar 8 respectively project to the opposite sides of the housing 9, and tie rods 12 are respectively coupled to the opposite end portions of the rack bar 8 via joints 11. Each of the tie rods 12 is connected to a corresponding one of steered wheels 13 via a corresponding one of knuckle arms (not illustrated).

When the steering member 2 is operated to rotate the steering shaft 3, the rotation of the steering shaft 3 is converted into a linear motion of the rack bar 8 along the axial direction X by the pinion 14 and the rack 15. Thus, the steered wheels 13 are steered. The rack bar 8 mainly includes a pipe 10, metal rings 16, and two metal members, that is, a first metal member 17 and a second metal member 18 each having a columnar shape. Because the first metal member 17 and the second metal member 18 constitute the rack bar 8, the first metal member 17 and the second metal member 18 are required to have strength and rigidity that are high enough to endure a load that the rack bar 8 receives. Therefore, carbon steel such as S45C is used as a material of the first metal member 17 and the second metal member 18. The second metal member 18 has the rack 15. The rack 15 is formed by cutting the second metal member 18 having a columnar shape.

The pipe 10 is made of a carbon fiber reinforced plastic (so-called CFRP), and is a generally cylindrical member extending in the axial direction X. In the rack bar 8, the pipe 10 is disposed, for example, on the left side X1 with respect to the rack 15, and is located between the first metal member 17 and the second metal member 18 in the axial direction X. The metal rings 16 are annular members made of metal extending in the axial direction X. One of the metal rings 16 is disposed at an end portion 10A of the pipe 10 on the left side X1 and the other one of the metal rings 16 is disposed at an end portion 10B of the pipe 10 on the right side X2 (i.e., there are two metal rings 16 in total). The two metal rings 16 are respectively fitted in (internally fitted to) the end portion 10A and the end portion 10B (i.e., one of the metal rings 16 is fitted in the end portion 10A and the other one of the metal rings 16 is fitted in the end portion 10B). In other words, the end portion 10A and the end portion 10B of the pipe 10 are respectively externally fitted onto outer peripheral faces 16A of the metal rings 16. The diameter of an inner peripheral face 10C of the pipe 10 at each of the end portion 10A and the end portion 10B is increased to a value substantially equal to the diameter of each of the outer peripheral faces 16A of the metal rings 16. The diameter of each of inner peripheral faces 16B of the metal rings 16 is substantially equal to the diameter of the inner peripheral face 10C of the pipe 10 in a region between the end portion 10A and the end portion 10B.

The first metal member 17 is an end portion of the rack bar 8 on the left side X1, and adjoins the joint 11 on the left side X1. The first metal member 17 adjoins the end portion 10A of the pipe 10 from the left side X1 of the rack bar 8. A small-diameter portion 21 is formed integrally with an end portion of the first metal member 17 on the right side X2. The small-diameter portion 21 is a columnar portion extending in the axial direction X toward the right side X2. The small-diameter portion 21 has a diameter smaller than that of the first metal member 17 (a portion of the first metal member 17 other than the small-diameter portion 21).

The second metal member 18 is subjected to quenching treatment such as carburizing quenching or high-frequency quenching in order to prevent wear of the rack 15. The second metal member 18 adjoins the end portion 10B of the pipe 10 from the right side X2 of the rack bar 8. A small-diameter portion 21, which is similar to the small-diameter portion 21 described above, is formed integrally with an end portion of the second metal member 18 on the left side X1. The small-diameter portion 21 of the second metal member 18 is a columnar member extending in the axial direction X toward the left side X1. Note that, the small-diameter portion 21 of the first metal member 17 and the small-diameter portion 21 of the second metal member 18 may have different dimensions (diameters or lengths in the axial direction X). Although the details will be described later, the first metal member 17 and the second metal member 18 are fastened at the small-diameter portions 21 to the end portion 10A and the end portion 10B of the pipe 10 in the axial direction X, respectively. The pipe 10, the first metal member 17, and the second metal member 18 in the fastened state constitute the bar member 22 extending in the axial direction X as a whole. The bar member 22 constitutes the rack bar 8.

There has been a demand for weight reduction in automobile parts as environmental measures. Meanwhile, the rack bar 8 accounts for a large portion of the total weight of the steering apparatus 1. Because the rack bar 8 in the present embodiment is partially formed of the pipe 10 made of CFRF, the rack bar 8 is lighter than a rack bar in a case where the entirety of the rack bar is made of metal such as steel. Further, the CFRF has excellent strength and rigidity. Therefore, it is possible to significantly reduce the weight of the steering apparatus 1 while maintaining required strength and rigidity.

Figure 2:
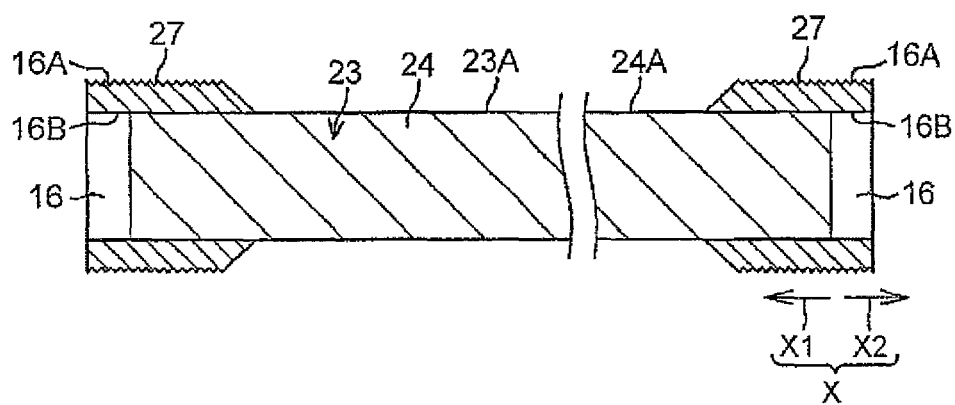
FIG. 2 is a schematic sectional view illustrating a step of manufacturing the bar member.

Next, a method of manufacturing the bar member 22 as described above will be described. FIG. 2 is a schematic sectional view illustrating a step of manufacturing the bar member 22. The positions of members in FIG. 2 coincide with those in FIG. 1 (the same applies to FIG. 3, and FIG. 5 to FIG. 9 described later). As illustrated in FIG. 2, a core member 23 is prepared in an initial stage of manufacturing the bar member 22. The core member 23 is a member required to form the cylindrical pipe 10. The core member 23 includes a mandrel 24 and the metal rings 16 described above. The mandrel 24 is made of metal, and is a columnar member extending in the axial direction X. The outer peripheral faces 16A of the metal rings 16 are subjected to surface roughening in advance. Therefore, the outer peripheral faces 16A have a large number of asperities 27. Examples of the surface roughening include diamond knurling, key groove machining, spline machining, shot blasting, etching with add, and laser etching. In consideration of machining cost, the diamond knurling is preferably employed.

Figure 3:
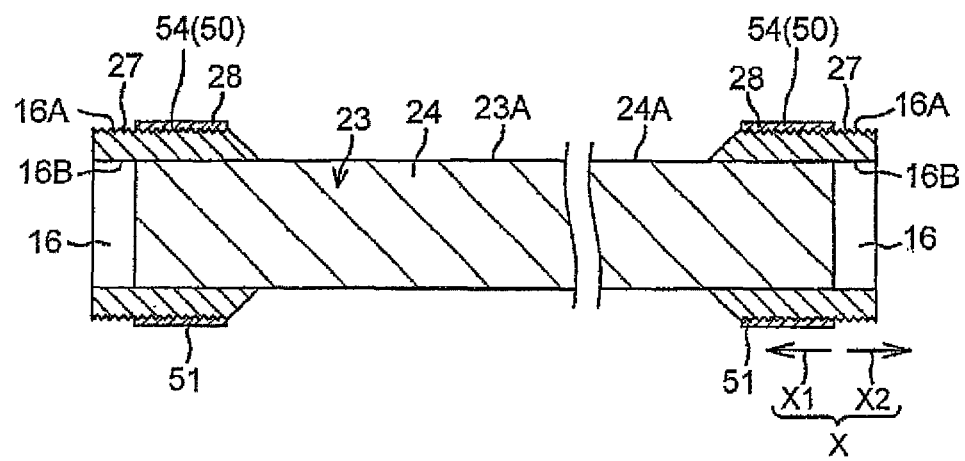
FIG. 3 is a view schematically illustrating a step next to the step illustrated in FIG. 2.
Figure 4:
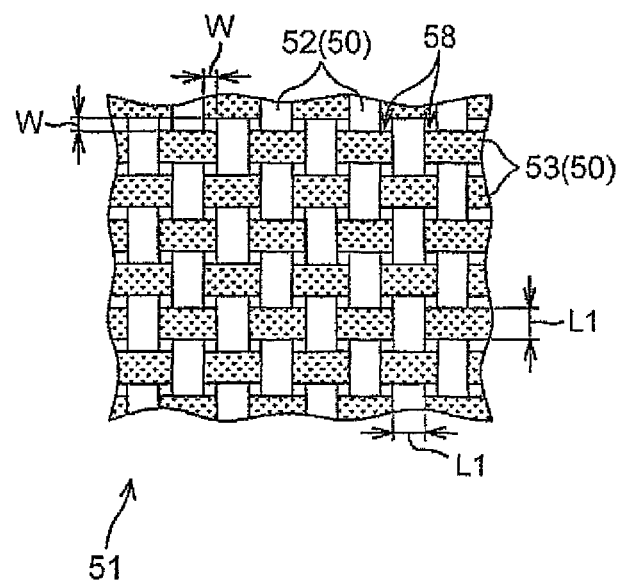
FIG. 4 is a view illustrating fabric of glass fibers.

In the preparation step illustrated in FIG. 2, the core member 23 is formed by externally fitting the metal rings 16 onto the opposite end portions of the mandrel 24 in the axial direction X. An outer peripheral face 23A of the core member 23 includes the outer peripheral faces 16A of the metal rings 16 and a portion of an outer peripheral face 24A of the mandrel 24, which protrudes from the metal rings 16. FIG. 3 is a view schematically illustrating a step next to the step illustrated in FIG. 2. FIG. 4 is a view illustrating fabric 51 of glass fibers 50.

Subsequently, the glass fibers 50 (more specifically, a glass fiber prepreg 54 described later) are wound around the outer peripheral face 16A of each of the metal rings 16 as illustrated in FIG. 3. As illustrated in FIG. 4, the glass fibers 50 form the fabric 51 in the present embodiment. The fabric 51 is formed by weaving together bundles 52 of the glass fibers 50 extending linearly in a prescribed direction, and bundles 53 of the glass fibers 50 extending in a direction crossing (here, perpendicular to) the bundles 52 by plain weave. In FIG. 4, the bundles 52 extend in the up-down direction of the sheet on which FIG. 4 is drawn, and the bundles 53 extend in the right-left direction of the sheet on which FIG. 4 is drawn so as to be perpendicular to the bundles 52. A method of weaving the fabric 51 is not limited to the plain weave, and common weaving methods such as twill weave, satin weave, and multi-axial weave may be applied.

Referring again to FIG. 3, the fabric 51 is impregnated with a resin 28, to thereby form the glass fiber prepreg 54 in the form of a sheet. As the resin 28, a thermosetting resin such as an epoxy resin, a polyimide resin, a bismaleimide resin, and an unsaturated polyester resin may be used. Because the rack bar 8 is used in an engine room of the vehicle, a curing temperature of the resin 28 is desired to be equal to or higher than the upper-limit temperature (for example, 130° C. or higher) expected in the engine room.

Figure 5:
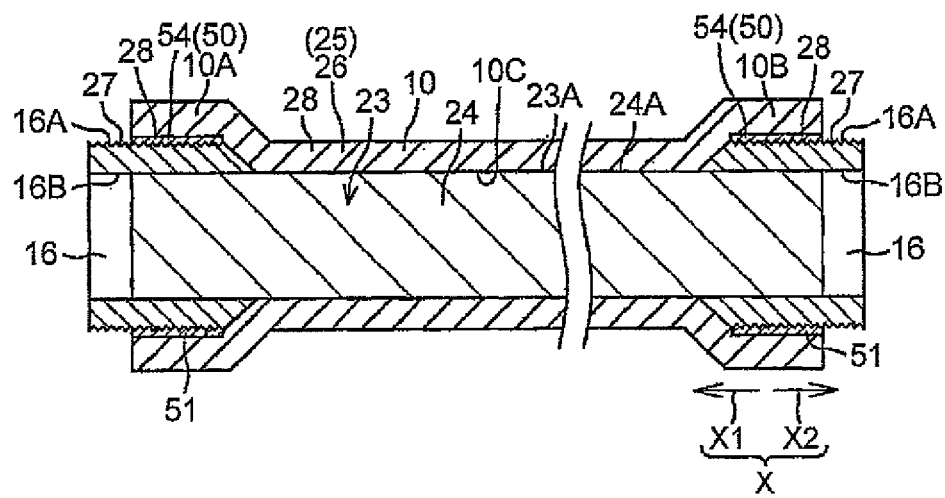
FIG. 5 is a view schematically illustrating a step next to the step illustrated in FIG. 3.

In the step illustrated in FIG. 3, the glass fiber prepreg 54 is wound around the outer peripheral face 16A of each of the metal rings 16 by, for example, a sheet winding method. In the wound state, the glass fiber prepreg 54 is in close contact with the asperities 27 of each of the outer peripheral faces 16A, and has a generally cylindrical shape as a whole. FIG. 5 is a view schematically illustrating a step next to the step illustrated in FIG. 3.

With reference to FIG. 5, a carbon fiber prepreg 26 is used as a prepreg sheet that is a material of the pipe 10 described above. The carbon fiber prepreg 26 is in the form of a sheet obtained, for example, by impregnating a large number of carbon fibers arranged in a uni-direction with the resin 28. Various kinds of carbon fibers represented by "Torayca" (registered trademark) T300 or "Torayca" (registered trademark) T700 may be used for the carbon fiber prepreg 26. The carbon fibers 25 used for the carbon fiber prepreg 26 may be partially replaced with glass fibers or aramid fibers.

In the step illustrated in FIG. 5, the carbon fiber prepreg 26 is wound around the outer peripheral face 23A of the core, member 23 once, or twice or more by, for example, a sheet winding method. In the wound state, the carbon fiber prepreg 26 extends over the mandrel 24, the metal rings 16 and the glass fiber prepregs 54. Further, because the carbon fiber prepreg 26 surrounds the core, member 23 in close contact with the outer peripheral face 24A of the mandrel 24 and the glass fiber prepregs 54, the carbon fiber prepreg 26 has a generally cylindrical shape as a whole. When the carbon fiber prepreg 26 is in the wound state, the fabric 51 of the glass fibers 50 is interposed between the carbon fiber prepreg 26 and the outer peripheral face 16A of each of the metal rings 16, and is disposed on the outer peripheral face 16A, at a position radially inward of the carbon fiber prepreg 26 the fabric 51 forms the innermost layer).

Further, the opposite end portions of the carbon fiber prepreg 26 in the wound state in the axial direction X have a diameter larger than that of a portion of the carbon fiber prepreg 26 other than the opposite end portions in the axial direction X, by an amount corresponding to the thickness of the metal ring 16 and the glass fiber prepreg 54. On the other hand, the inner diameter of the carbon fiber prepreg 26 in the portion other than the opposite end portions in the axial direction X of the carbon fiber prepreg 26 is substantially equal to the inner diameter of each of the metal rings 16.

The opposite end portions of the carbon fiber prepreg 26 in the axial direction X may extend up to positions on the outer sides of the glass fiber prepregs 52 in the axial direction X. In this case, the carbon fiber prepreg 26 is in close contact with the outer peripheral faces 16A of the metal rings 16, at the opposite end portions in the axial direction X. Subsequently, the carbon fiber prepreg 26 and the glass fiber prepregs 54 wound around the outer peripheral face 23A of the core member 23 are cured by baking. By the bake-curing, the shape of the carbon fiber prepreg 26 is fixed in the generally cylindrical shape that is formed when the carbon fiber prepreg 26 is wound around the outer peripheral face 23A of the core member 23. On the other hand, the shape of each of the glass fiber prepregs 54 is fixed in the generally cylindrical shape having an inner peripheral face that conforms to the asperities 27 of the outer peripheral face 16A of each of the metal rings 16. After that, the carbon fiber prepreg 26 is cooled at room temperature to be turned into the pipe 10. That is, the pipe 10 is formed by bake-curing the carbon fiber prepreg 26 wound around the outer peripheral face 23A. In this state, the pipe 10 is externally fitted (more specifically, externally fitted and fixed as described later) onto the outer peripheral faces 16A of the metal rings 16, at the end portions 10A, 10B.

The carbon fiber prepreg 26 is wound around the outer peripheral face 23A of the core member 23 mainly in such a winding method that the direction in which the carbon fibers 25 extend is oblique to the axial direction X (so-called helical winding). Therefore, the carbon fibers 25 within the pipe 10 extend in a prescribed direction that is oblique to the axial direction X, so that the pipe 10 has a high strength with respect to the axial direction X. Subsequently, only the mandrel 24 in the core member 23 is pulled out of the pipe 10. At this time, the mandrel 24 may be shrunk by cooling so as to be smoothly pulled out. In this case, a force required to pull the mandrel 24 out of the pipe 10 is reduced.

After the mandrel 24 is pulled out of the pipe 10, each of the metal rings. 16 remains internally fitted to a corresponding one of the end portion 10A and the end portion 10B of the pipe 10. It is also preferable that the metal rings 16 partially (for example, about 2 mm of end portions in the axial direction X) protrude to the outside of the end portion 10A and the end portion 10B of the pipe 10 in the axial direction X. For this reason, when each of the glass fiber prepregs 54 and the carbon fiber prepreg 26 is wound around the outer peripheral face 23A of the core member 23, a portion of each of the metal rings 16 may be exposed so as to protrude to the outside side of the completed pipe 10 in the axial direction X. In other words, when each of the glass fiber prepregs 54 and the carbon fiber prepreg 26 is wound around the outer peripheral face 23A of the core member 23, the glass fiber prepregs 54 and the carbon fiber prepreg 26 are not wound around the portion of each of the metal rings 16.

Figure 6:
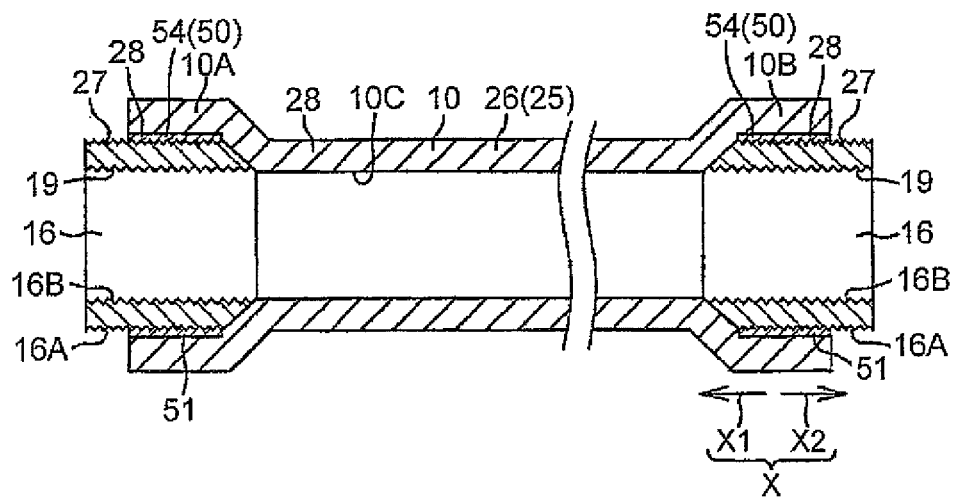
FIG. 6 is a view schematically illustrating a step next to the step illustrated in FIG. 5.

FIG. 6 is a view schematically illustrating a step next to the step illustrated in FIG. 5. With reference to FIG. 6, a female threaded portion 19 is subsequently formed on the inner peripheral face 16B of each of the metal rings 16. The female threaded portion 19 is formed over an entire region of the inner peripheral face 16B. In a case of a comparative example in which the metal rings 16 are not used unlike in the present embodiment, the pipe 10 and the first and second metal members 17, 18 are connected together by using a connection method such as screwing, helical insert fastening, and spline press-fitting. Therefore, in the case of the comparative example, it is necessary to perform screw machining or spline machining on the inner peripheral face 10C of the pipe 10. In the case of the comparative example, when, the carbon fiber prepreg 26 is wound around the core member 23 by helical winding, there is a possibility that the carbon fibers 25 within the carbon fiber prepreg 26 are cut off at the time of screw machining or spline machining. When the carbon fibers 25 are cut off connection strength between the pipe 10 and the first and second metal members 17, 18 is significantly lowered. Thus, when a load is applied to the pipe 10, a connection portion between the pipe 10 and the first and second metal members 17, 18 serves as a fracture source. In order to prevent the carbon fibers 25 from being cut off in the comparative example, it is necessary to wind, around the core member 23, the carbon fiber prepreg 26 at least in an innermost layer (closest to the core member 23) by a winding method in which the carbon fibers 25 extend in a circumferential direction of the core member 23 (so-called hoop winding).

On the other hand, in the present embodiment, it is not necessary to perform the screw machining or spline machining on the pipe 10 since the metal rings 16 where the female threaded portions 19 are formed are used. Therefore, the pipe 10 can be formed only by helical winding (or with a higher percentage of helical winding). That is, in the present embodiment, the pipe 10 can be formed only by one type of winding method. It is thus possible to correspondingly decrease the number of windings of the carbon fiber prepreg 26 (to the core member 23) and increase the strength in the axial direction X as compared to the comparative example. That is, cost decrease, weight reduction, and strength improvement of the pipe 10 can be achieved by using the metal rings 16. A weight of the rack bar 8 is reduced by 45% by the weight reduction.

Figure 7:
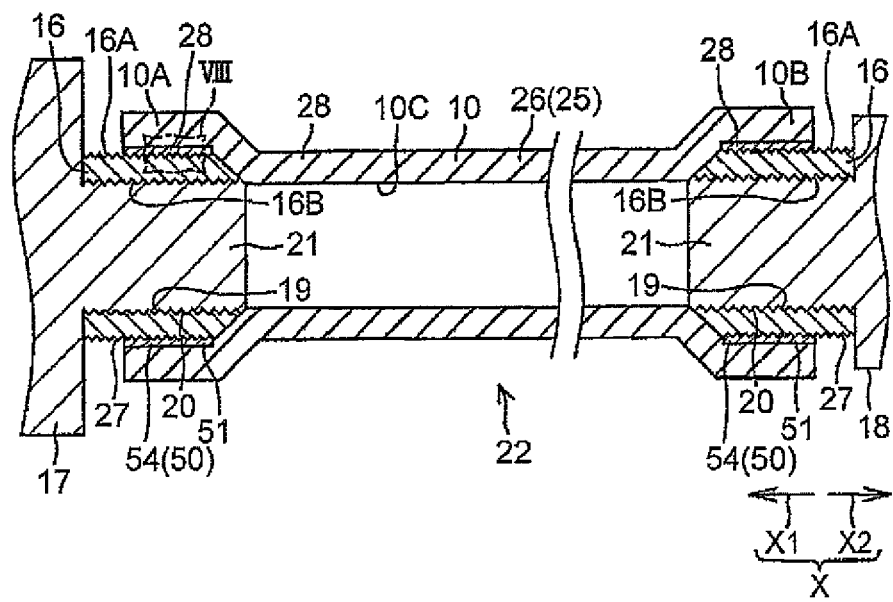
FIG. 7 is a view schematically illustrating a step next to the step illustrated in FIG. 6.

FIG. 7 is a view schematically illustrating a step next to the step illustrated in FIG. 6. With reference to FIG. 7, a male threaded portion 20 is provided on an outer peripheral face of the small-diameter portion 21 of the first metal member 17. The female threaded portion 19 of the metal ring 16 on the left side X1 is screwed to the male threaded portion 20 of the first metal member 17. Accordingly, the first metal member 17 is screwed with the inner peripheral face 16B of the metal ring 16, and is fastened to the end portion 10A of the pipe 10 via the metal ring 16.

On the other hand, a male threaded portion 20 is also provided on an outer peripheral face of the small-diameter portion 21 of the second metal member 18. The female threaded portion 19 of the metal ring 16 on the right side X2 is screwed to the male threaded portion 20 of the second metal member 18. Accordingly, the second metal member 18 is screwed with the inner peripheral face 16B of the metal ring 16, and is fastened to the end portion 10B of the pipe 10 via the metal ring 16. The pipe 10 is thereby fastened to the first metal member 17 and the second metal member 18 at the both end portions 10A, 10B in the axial direction X, so that the manufacture of the bar member 22 is completed.

In the completed bar member 22, a portion of each of the metal rings 16 protrudes to the outer side in the axial direction X from the pipe 10 as described above. Therefore, when the pipe 10 is to be bent against the first metal member 17 and the second metal member 18, the first metal member 17 and the second metal member 18 come into contact with the metal rings 16, not the pipe 10. It is thus possible to prevent each of the end portions 10A, 10B of the pipe 10 from coming into contact with the corresponding one of the first metal member 17 and the second metal member 18. Accordingly, it is possible to prevent the pipe 10 from being damaged by coming into contact with the first metal member 17 and the second metal member 18.

Figure 8:
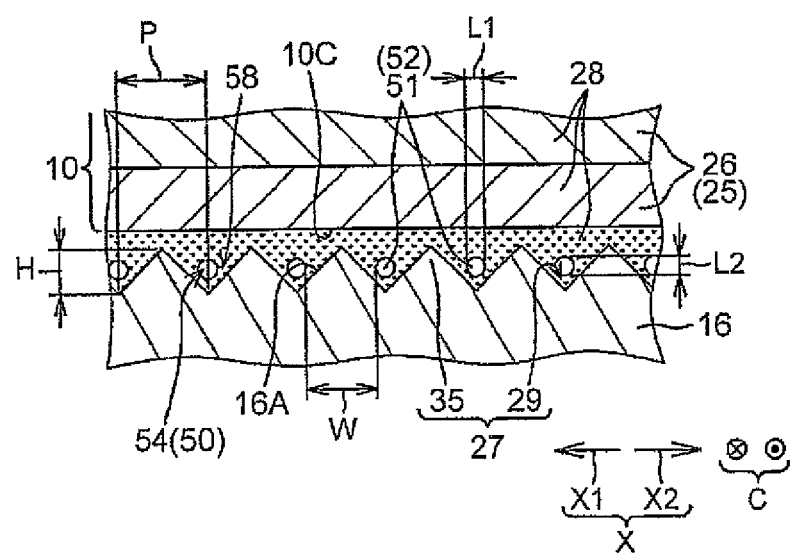
FIG. 8 is an enlarged view of a portion surrounded by a dashed line in FIG. 7.

FIG. 8 is an enlarged view of a portion surrounded by a dashed line in FIG. 7. With reference to FIG. 8, the resin 28 oozing out from the carbon fiber prepreg 26 and the glass fiber prepreg 54 is interposed between the inner peripheral face 10C of the pipe 10 and the outer peripheral race 16A of the metal ring 16 in the completed bar member 22. The resin 28 enters respective concave portions 29 of the asperities 27 formed on the outer peripheral face 16A, and is cured therein in the step of winding the carbon fiber prepreg 26 around the core member 23, and the subsequent bake-curing step described above (see FIG. 5). Accordingly, since the end portions 10A, 10B of the pipe 10 are in close contact with the outer peripheral faces 16A of the metal rings 16, the pipe 10 is hardly pulled out of the metal rings 16. Since the glass fiber prepregs 54 are also interposed between the carbon fiber prepreg 26 and, the outer peripheral faces 16A, strictly, the carbon fibers 25 do not come into contact with convex portions 35 of the asperities 27.

Also, the first and second metal members 17, 18 and the metal rings 16 are screwed together. Thus, unlike in a case in which the first metal member 17 and the second metal member 18 are press-fitted into the metal rings 16, the pipe 10 (strictly, the end portions 10A, 10B) and each of the first metal member 17 and the second metal member 18 can be fastened together without applying an unnecessary force to the metal rings 16. That is, the outer peripheral faces 16A of the metal rings 16 do not bite into the pipe 10, and the carbon fibers 25 within the pipe 10 are thus not cut off unlike in the case of press-fitting. Therefore, the strength in the connection portion between the pipe 10 and the first and second metal members 17, 18 is not lowered due to the cutting-off of the carbon fibers 25.

When the metal rings 16 are used, the carbon fibers 25 within the pipe 10 are not cut off as described above. However, when the carbon fiber prepreg 26 is directly wound around the outer peripheral face 23A of the core member 23 by the sheet winding method described above, it is difficult to place the carbon fiber prepreg 26 along the asperities. 27 of the metal rings 16. Therefore, strength in a connection portion between the metal rings 16 and the pipe 10 is weakest in the bar member 22. Therefore, the pipe 10 could be detached from the metal rings 16 depending on a stress applied to the bar member 22.

However, in the present embodiment, the glass fibers 50 are fixed in a state in which the glass fibers 50 enter the concave portions 29 of the outer peripheral face 16A of each of the metal rings 16, and are caught on the convex portions 35 of the outer peripheral face 16A of each of the metal rings 16 after the bake-curing. Thus, the pipe 10 is more hardly detached from the metal rings 16 with the glass fibers 50 therebetween. As described above, the end portions 10A, 10B of the pipe 10 are externally fitted and fixed to (prevented from being detached from) the outer peripheral faces 16A of the corresponding metal rings 16 in a state in which the carbon fibers 25 within the pipe 10 are not cut off. The metal rings 16 in the state are positioned so as not to be displaced in the axial direction X or a circumferential direction of the pipe 10 with respect to the end portions 10A, 10B of the pipe 10.

As the result, the pipe 10 can be prevented from being detached from the metal rings 16 that are members made of metal. Also, as described above, the glass fibers 50 of the present embodiment form the fabric 51. In FIG. 8, the fabric 51 is arranged such that the bundles 52 of the glass fibers 50 (see FIG. 4) are aligned with a circumferential direction C of the outer peripheral face 16A of the metal ring 16. Here, a thickness L1 of each of the bundles 52 and 53 in the axial direction X or the circumferential direction C (see FIG. 4) is smaller than a pitch P between the convex portions 35 of the asperities 27 (also a pitch between the concave portions 29). Also, a thickness L2 of each of the bundles 52 and 53 in a radial direction of the outer peripheral face 16A is smaller than a height H of the convex portions 35 (a depth of the concave portions 29). Therefore, the bundles 52 and 53 can enter the concave portions 29.

Therefore, the convex portions 35 of the outer peripheral face 16A of each of the metal rings 16 enter interstices 58 of the fabric 51, so that the glass fibers 50 in the fabric 51 enter the concave portions 29 of the outer peripheral face 16A of each of the metal rings 16, and are fixed to the outer peripheral face 16A of each of the metal rings 16 by the bake-curing. Accordingly, the metal rings 16 and the pipe 10 are more rigidly fixed together, and the pipe 10 becomes more hardly detached from the metal rings 16.

Here, a width W of each of the interstices 58 in the circumferential direction C and the axial direction X (an interval between the adjacent bundles 52, and an interval between the adjacent bundles 53) is desired to be larger than the pitch P between the convex portions 35. When the interstices 58 are loose enough that the width W of each of the interstices 58 is larger than the pitch P, the convex portions 35 of the asperities 27 easily enter the respective interstices 58 in the step of winding the glass fiber prepreg 54 around the outer peripheral face 16A of each of the metal rings 16. Accordingly, the bundles 52 and 53 more easily enter the concave portions 29 of the asperities 27. The pipe 10 thereby becomes more hardly detached from the metal rings 16.

Figure 9:
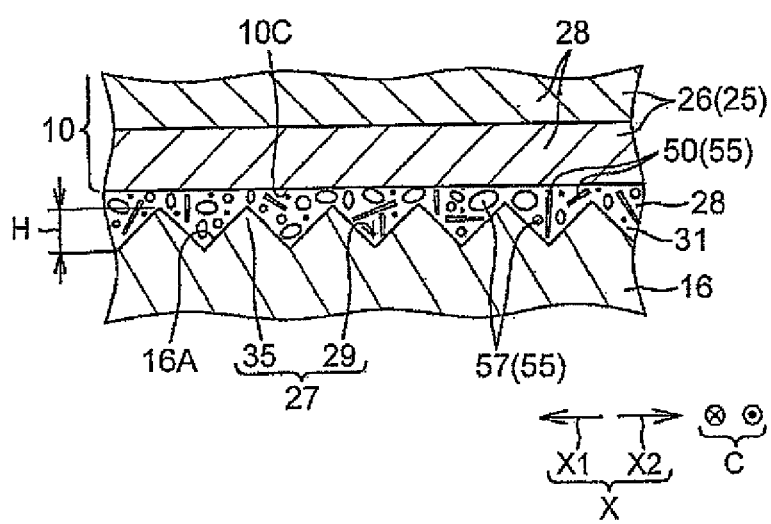
FIG. 9 is a view obtained by applying a first modification to FIG. 8.

Next, a first modification of the present invention is described. FIG. 9 is a view obtained by applying the first modification to FIG. 8. Members similar to those described above are assigned the same reference numerals in FIG. 9, and the description is omitted. With reference to FIG. 9, the step of winding the glass fibers 50 around the outer peripheral face 16A of the metal ring 16 in the first modification includes a step of winding a non-woven fabric 55 of the glass fibers 50 around the outer peripheral face 16A. As the non-woven fabric 55, for example, a chopped strand mat is preferably used. The glass fibers 50 in the first modification have a rod-like shape of about 0.5 to 20 mm, and are dispersed in the non-woven fabric 55. The non-woven fabric 55 also includes the glass fibers 50 having a different shape in section and glass flakes 57 having a planar shape in addition to the rod-like glass fibers 50.

By winding the carbon fiber prepreg 26 around the outer peripheral face 23A of the core member 23 after winding the non-woven fabric 55 around the outer peripheral face 16A of each of the metal rings 16, the non-woven fabric 55 is interposed between the outer peripheral face 16A of each of the metal rings 16 and the carbon fiber prepreg 26. After that, the carbon fiber prepreg 26 is cured by baking, so that the pipe 10 is formed. Accordingly, the non-woven fabric 55 is fixed between the carbon fiber prepreg 26 and each of the metal rings 16 by the resin 28 oozing out from the carbon fiber prepreg 26.

Therefore, the glass fibers 50 and the glass flakes 57 in the non-woven fabric 55 are fixed entering the concave portions 29 of the outer peripheral face 16A of each of the metal rings 16 in a state in which the glass fibers 50 and the glass flakes 57 are oriented in various directions. The glass fibers 50 and the glass flakes 57 are caught on the convex portions 35 of the outer peripheral face 16A of each of the metal rings 16 from various, directions to effectively act as resistance. The pipe 10 thereby becomes more hardly detached from the metal rings 16.

The present invention is not limited to the embodiment described above, and various changes may be made within the scope of the claims. For example, in the present embodiment, the step of providing, on the inner peripheral faces 16B of the metal rings 16, the female threaded portions 19 that are to be screwed to the male threaded portions 20 provided on the first metal member 17 and the second metal member 18 is performed after the mandrel 24 is pulled out of the pipe 10. However, the step may be performed before the metal rings 16 are externally fitted to the mandrel 24.

Also, the step of winding the glass fibers 50 around the outer peripheral face 16A of each of the metal rings 16 may include a step of winding an SMC (sheet molding compound) sheet or a stampable sheet, in which the glass fibers 50 having a rod-like shape of about 0.5 to 20 mm are dispersed, around the outer peripheral face 16A. The glass fibers 50 may be also substituted with carbon fibers, aramid fibers, or other organic fibers.

Also, the step of winding the glass fibers 50 around the outer peripheral face 16A of each of the metal rings 16 may include a step of winding the fabric 51 that is not impregnated with the resin 28 around the outer peripheral face 16A. In this case, the fabric 51 is fixed to the outer peripheral face 16A by the resin 28 oozing out from the carbon fiber prepreg 26. Also, the types of the thermosetting resins of the resin 28 with which the carbon fiber prepreg 26 is impregnated and the resin 28 with which the glass fiber prepreg 54 is impregnated may be different from each other.

Also, the bar member 22 of the aforementioned embodiment has a configuration in which the metal members (the first metal member 17 and the second metal member 18) are fastened to the both end portions (both of the end portions 10A, 10B) of the pipe 10, the bar member 22 may also have a configuration in which the metal member is fastened to only one of the both end portions. Also, although the bar member 22 of the aforementioned embodiment is the rack bar 8, a bar member other than the rack bar 5 (e.g., various shafts, rods, pipe-like components) may be also employed.

What is claimed is:

1. A method of manufacturing a bar member including a pipe made of a carbon fiber reinforced resin, and a metal member that is fastened to an end portion of the pipe in an axial direction of the pipe, the method comprising:
    forming a core member including a mandrel made of metal that extends in the axial direction and a metal ring having an outer peripheral face subjected to face roughening, by externally fitting the metal ring onto the mandrel;
    winding glass fibers around the outer peripheral face of the metal ring;
    interposing the glass fibers between a prepreg sheet obtained by impregnating carbon fibers with a resin and the outer peripheral face of the metal ring by winding the prepreg sheet around an outer peripheral face of the core member, wherein the prepreg sheet is in close contact with an outer peripheral face of the mandrel and the glass fibers;
    forming the pipe where the end portion is externally fitted and fixed to the outer peripheral face of the metal ring by baking and curing the prepreg sheet wound around the outer peripheral face of the core member;
    pulling only the mandrel in the core member out of the pipe; and
    screwing together the metal member and an inner peripheral face of the metal ring.

2. The method of manufacturing a bar member according to claim 1, wherein a process of winding the glass fibers around the outer peripheral face of the metal ring includes a process of winding fabric of the glass fibers around the outer peripheral face of the metal ring.

3. The method of manufacturing a bar member according to claim 1, wherein of a process of winding the glass fibers around the outer peripheral face of the metal ring includes a process of winding a non-woven fabric of the glass fibers around the outer peripheral face of the metal ring.

4. The method of manufacturing a bar member according to claim 1, further comprising exposing a portion of the metal ring such that the portion protrudes to an outer side in the axial direction from the completed pipe when each of the glass fibers and the prepreg sheet is wound around the outer peripheral face of the core member.

5. The method of manufacturing a bar member according to claim 1, further comprising forming, on the inner peripheral face of the metal ring, a female threaded portion that is to be screwed to a male threaded portion provided on the metal member.

6. A bar member manufactured by the manufacturing method according to claim 1.

7. The bar member according to claim 6, wherein the bar member constitutes a rack bar included in a rack-and-pinion-type steering apparatus.

* * * * *